United States Patent
Chau et al.

(10) Patent No.: US 10,001,830 B2
(45) Date of Patent: Jun. 19, 2018

(54) INPUT-OUTPUT DEVICE MANAGEMENT USING DYNAMIC CLOCK FREQUENCY

(71) Applicant: Marvell World Trade Ltd., St. Michael (BB)

(72) Inventors: Benson Chau, Santa Clara, CA (US); Frank Huang, Dublin, CA (US); Xiaohua Luo, Cupertino, CA (US); Venkatachalam Shanmugasundaram, Cupertino, CA (US)

(73) Assignee: Marvell World Trade Ltd., St. Michael (BB)

(*) Notice: Subject to any disclaimer, the term of this patent is extended or adjusted under 35 U.S.C. 154(b) by 96 days.

(21) Appl. No.: 14/728,918

(22) Filed: Jun. 2, 2015

(65) Prior Publication Data

US 2015/0362974 A1    Dec. 17, 2015

Related U.S. Application Data (60) Provisional application No. 62/012,934, filed on Jun. 16, 2014.

(51) Int. Cl.
*G06F 1/26* (2006.01)
*G06F 1/32* (2006.01)

(52) U.S. Cl.
CPC .......... *G06F 1/325* (2013.01); *G06F 1/26* (2013.01); *G06F 1/324* (2013.01); *Y02B 60/1217* (2013.01)

(58) Field of Classification Search
CPC ............ G06F 1/26; G06F 1/324; G06F 1/325
See application file for complete search history.

(56) References Cited

U.S. PATENT DOCUMENTS

| 5,490,093 | A  | * | 2/1996  | Koepke    | F41G 7/001  |
|           |    |   |         |           | 244/3.15    |
| 8,001,285 | B1 | * | 8/2011  | Bar-Shalom| G06F 13/385 |
|           |    |   |         |           | 710/5       |
| 8,117,469 | B2 | * | 2/2012  | Schmitz   | G06F 1/3203 |
|           |    |   |         |           | 702/108     |
| 8,181,059 | B2 | * | 5/2012  | Millet    | G06F 1/3209 |
|           |    |   |         |           | 713/300     |
| 8,312,299 | B2 | * | 11/2012 | Tremel    | G06F 1/3203 |
|           |    |   |         |           | 713/300     |
| 8,959,382 | B2 | * | 2/2015  | Vogel     | G06F 1/10   |
|           |    |   |         |           | 710/267     |
| 9,189,053 | B2 | * | 11/2015 | Cui       | G06F 1/3203 |
| 9,363,749 | B2 | * | 6/2016  | Mathew    | H04W 52/02  |
| 2008/0200166 | A1 | * | 8/2008 | McCamon  | H04W 48/16  |
|           |    |   |         |           | 455/426.1   |

(Continued)

*Primary Examiner* — Thomas Lee
*Assistant Examiner* — Mohammad A Rahman (57) ABSTRACT

In an example, a method includes determining, at a host device, a power state of a digital input/output device, and transmitting a clock signal having a first frequency from the host device to the input/output device responsive to a determination that the input/output device is in a lower power state. The method also includes determining, at the host device, that the input/output device has transitioned into a higher power state, and transmitting a clock signal having a second frequency from the host device to the input/output device responsive to a determination that the input/output device has transitioned into the higher power state. The first frequency is lower than the second frequency.

23 Claims, 3 Drawing Sheets

(56) References Cited

U.S. PATENT DOCUMENTS

| | | | |
|---|---|---|---|
| 2010/0069128 A1* | 3/2010 | Cheng | G06F 1/3203 |
| | | | 455/574 |
| 2013/0061068 A1* | 3/2013 | Tremel | G06F 1/3203 |
| | | | 713/300 |
| 2013/0172049 A1* | 7/2013 | Duong | H04B 15/00 |
| | | | 455/559 |
| 2014/0113690 A1* | 4/2014 | Shanmugasundaram | |
| | | | H04W 52/0225 |
| | | | 455/574 |

* cited by examiner

INPUT-OUTPUT DEVICE MANAGEMENT USING DYNAMIC CLOCK FREQUENCY

CROSS-REFERENCE TO RELATED APPLICATIONS

This disclosure claims priority to U.S. Provisional Application Ser. No. 62/012,934 titled "SDIO LOW POWER SCHEME USING DYNAMIC CLOCK FREQUENCY AND VOLTAGE CONTROL," filed on Jun. 16, 2014, the disclosure of which is incorporated herein by reference in its entirety.

BACKGROUND

This disclosure relates to managing the power consumption of an input-output device using a dynamically adjustable clock frequency.

Many electronic systems (often referred to as host systems or host devices) include embedded devices to control the operation of underlying system components and to provide enhanced functionality and operational flexibility. In some cases, embedded devices can be input-output devices that allow the host system to transmit information to and receive information from one or more other systems. Examples of input-output devices include GPS receivers, modems, barcode readers, FM radio/TV tuners, RFID readers, digital cameras, and interfaces to wired networks (e.g., Ethernet networks) and wireless networks e.g., Wi-Fi and Bluetooth networks).

In some cases, the embedded device can operate in accordance with one or more standards. For example, in some cases, the embedded device can operate in accordance with a Secure Digital Input/Output (SDIO) specification in order to provide input/output functionality in a common secure digital (SD) form factor (e.g., form factors such as "SD Standard," "SD Mini," and "SD Micro"); in these implementations, the embedded device 120 can sometimes be referred to as a "SDIO" device.

SUMMARY

In general, in an aspect, a method includes determining, at a host device, a power state of a digital input/output device, and transmitting a clock signal having a first frequency from the host device to the input/output device responsive to a determination that the input/output device is in a tower power state. The method also includes determining, at the host device, that the input/output device has transitioned into a higher power state, and transmitting a clock signal having a second frequency from the host device to the input/output device responsive to a determination that the input/output device has transitioned into the higher power state. The first frequency is lower than the second frequency.

Implementations of this aspect can include or more of the following features.

In some implementations, determining that the input/output device has transitioned into the higher power state can include transmitting, from the host device to the input/output device, a command to retrieve data from the input/output device or write data to the input/output device, receiving, at the host device from the input/output device, a message responsive to the command, and determining, at the host device, that the input/output device has transitioned into the higher power state based on the message. The command can include a CMD52 command or a CMD53 command in accordance with a secure digital input/output (SDIO) standard. The message can include an indication that the input/output device has successfully transitioned into the higher power state.

In some implementations, the lower power state can correspond to a sleep state of the input/output device, and the higher power state can correspond to an active state of the SDIO device.

In some implementations, the lower power state can correspond to a data transmission conducted by the input/output device according to a first communication standard, and the higher power state can correspond to a data transmission conducted by the input/output device according to a second communication standard. The first communication standard can be Bluetooth and the second communication standard can be Wi-Fi. The host device can operate according to a first dynamic power range white transmitting data according to the first communication standard, and the host device can operate according to a second dynamic power range while transmitting data according to the second communication standard. The first dynamic power range can be less than the second dynamic power range.

In some implementations, the method can further include determining, at the host device, that the input/output device is transitioning into the lower power state, and transmitting a clock signal having the first frequency from the host device to the input/output device responsive to a determination that the input/output device is transitioning into the lower power state. Determining that the input/output device is transitioning into the lower power state the power state of the input/output device can include transmitting, from the host device to the input/output device, a second command to enter the lower power state, receiving, at the host device from the input/output device, a second message responsive to the second command, and determining, at the host device, that the input/output device is transitioning into the lower power state based on the second message.

In some implementations, the method can further include transmitting, from the host device to the input/output device, a request to enumerate the first frequency and the second frequency, and receiving, at the host device from the input/output device, an indication of the first frequency and an indication of the second frequency.

In some implementations, the input/output device can be a secure digital input/output (SDIO) device.

In general, in another aspect, a digital input/output device includes an interface module communicatively configured to couple with a host device, a power module configured to couple with a power supply, and a controller coupled with the interface module and the power module. The controller is configured to transmit, to the host device via the interface module, a first messaging indicating that the input/output device is in a lower power state, and responsive to transmitting the first message, receive, from the host device via the interface module, a first clock signal having a first frequency. The controller is also configured to transmit, to the host device via the interface module, a second message indicating that the input/output device has transitioned into a higher power state, and responsive to transmitting the second message, receive, from the host device via the interface module, a second clock signal having a second frequency. The controller is also configured to direct the power module to draw power from the power supply according to a first power range while the interface module is receiving the first clock signal, and direct the power module to draw power from the power supply according to a second power range while the interface module is receiving the second clock signal. The first frequency is lower than the second frequency, and the first power range is less than the second power range.

Implementations of this aspect can include or more of the following features.

In some implementations, the second message can include a confirmation of a command to retrieve data from input/output device or write data to the input/output device. The command can include a CMD52 command or a CMD53 command in accordance with a secure digital input/output (SDIO) standard.

In some implementations, the second message can include an indication that the input/output device has successfully transitioned into the higher power state.

In some implementations, the system can further include a network module. The controller can be configured to direct the network module to transmit data to a communications network while the input/output device is in the higher power state, and not transmit data to the communications network while the input/output device is in the lower power state.

In some implementations, the system can further include a network module. The controller can be configured to direct the network module to transmit data according to a first communication standard while the input/output device is in the higher power state, and transmit data according to a second communication standard while the input/output device is in the lower power state. The first communication standard can be Wi-Fi and the second communication standard can be Bluetooth.

In some implementations, the controller can be further configured to transmit, to the host device via the interface module, a third message that the input/output device is transitioning into the lower power state, and responsive to transmitting the third message, receive, from the host device via the interface module, the first clock signal having the first frequency.

In some implementations, the power module can be configured to apply a first core voltage to a processing circuit of the controller while the interface module is receiving the first clock signal, and apply a second core voltage to the processing circuit of the controller while the interface module is receiving the second clock signal. The first core voltage can be less than the second core voltage.

In some implementations, the controller can be configured to generate an internal clock signal while the input/output device is in the higher power state, and not generate the internal clock signal white the input/output device is in the lower power state.

In some implementations, the digital input/output device can be a secure digital input/output (SDIO) device.

In general, in another aspect, a system includes a digital input/output device, and a host device coupled with the input/output device. The input/output device is configured to transmit, to the host device, a first message indicating that the input/output device is in a tower power state, and transmit, to the host device, a second message indicating that the input/output device has transitioned into a higher power state. The host device is configured to receive, from the input/output device, the first message, and responsive to receiving the first message, transmit, to the input/output device, a first clock signal having a first frequency. The host device is further configured to receive, from the input/output device, the second message, and responsive to receiving the second message, transmit, to the input/output device, a second clock signal having a second frequency. The first frequency is less than the second frequency.

One or more of the Wowing advantages can be realized. In some implementations, the frequency of a clock signal that is transmitted between a host device and an input-output device can be dynamically adjusted in order to reduce the input-output device's power requirements while it is in a lower power state (e.g., a "sleep" state, a "power save" state, or a reduced functionality state), while preserving the input-output device's ability to interpret wake-up commands transmitted from the host device. As a result, the embedded device can dynamically adjust the amount of power that it consumes and operate with increased power efficiency.

The details of one or more embodiments are set forth in the accompanying drawings and the description below. Other features and advantages will be apparent from the description and drawings, and from the claims.

DETAILED DESCRIPTION

This disclosure pertains to managing the power consumption of an embedded input-output device by dynamically adjusting the frequency of a clock signal that is transmitted between a host device and an input-output device in a communications subsystem. In some cases, the frequency of the clock signal can be decreased while the input-output device is in a lower power state (e.g., a "sleep" or a "power save" state), and increased while the input-output device is in a higher power state (e.g., a "wake" state or an "active" state). This dynamic adjustment can reduce the input-output device's power requirements while it is in its lower power state, while preserving the input-output device's ability to interpret wake-up commands transmitted from the host driver.

In some implementations, a host device continuously sends a clock signal to a corresponding input-output device. The input-output device can be initially in a higher power state, but can transition to a lower power state in order to reduce its power consumption. Prior to transitioning to the lower power state, the input-output device transmits a message to the host device indicating an impending change in power state. The host device transmits a confirmation response to the input-output device and reduces the frequency of the transmitted clock signal.

The host device can instruct the input-output device to transition back to the higher power state by transmitting a wake-up command according to the reduced clock signal frequency. Upon receiving the command, the input-output transmits a message to the host device indicating the change in power state. The host device transmits a confirmation response to the input-output device and increases the frequency of the transmitted clock signal. Thus, the clock signal that is transmitted between the host device and the input-output device is dynamically adjusted based on the power state of the input-output device.

Figure 1:
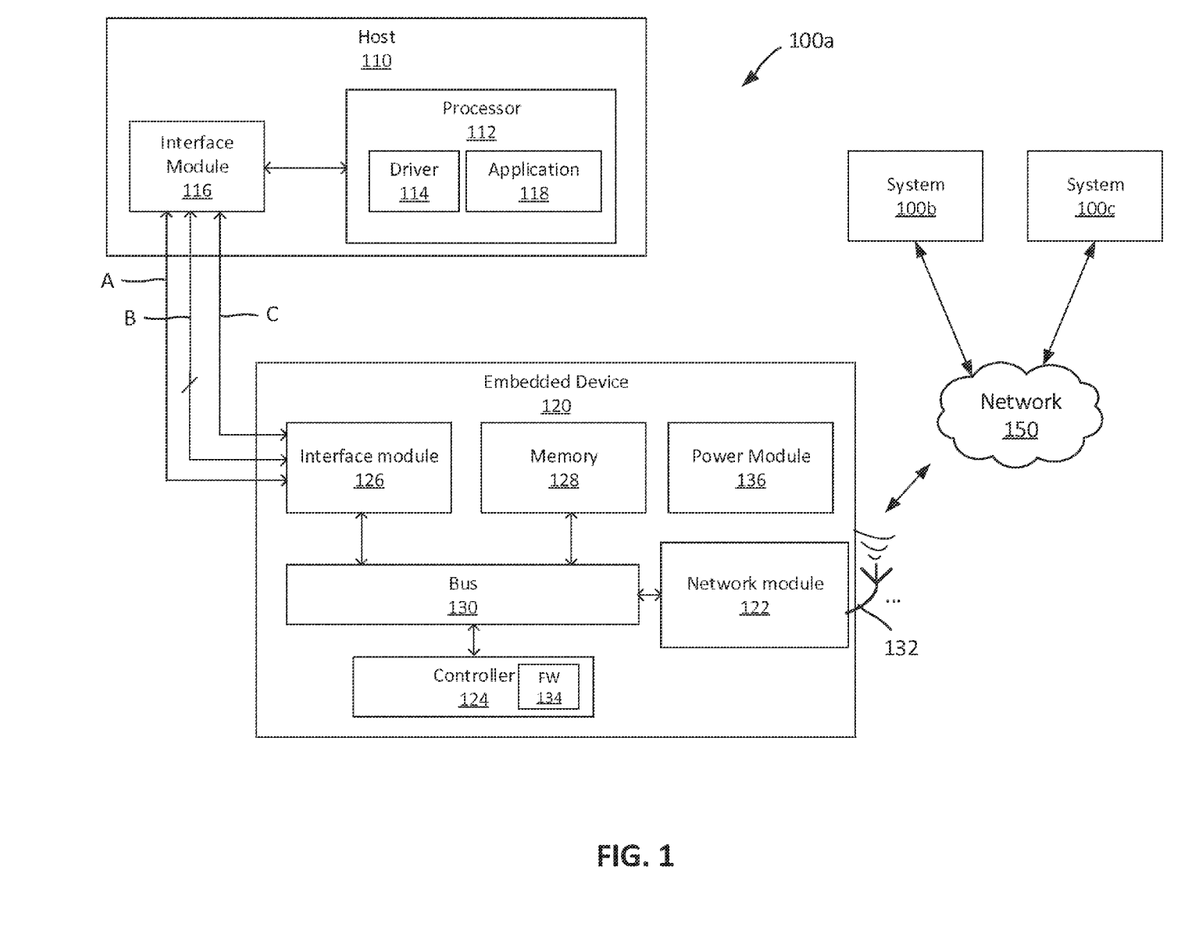
FIG. 1 is a diagram of an example of a system used to transmit and receive information over a network.

FIG. 1 shows an example of a system 100a used to transmit information to or receive information from one or more other systems over a network 150 (e.g., one or more other systems 100b-c in communication with the network 150). The system 100a includes a host 110 in communication with an embedded device 120.

In general, the host 110 is an electronic device that is used for storing and/or processing data. As an example, the host 110 can be a personal computer (e.g., a desktop computer or a notebook computer), a server computer, a tablet computer, a media player, a cellular phone (e.g., a smartphone or feature phone), or any other electronic device. The host 110 includes a processor 112, a driver 114, and an interface module 116.

The processor 112 generally controls the operation of the host 110. For example, in some cases, the processor 112 interprets information received by the host 110, and generates commands to control one or more of the components of the host 110. In some cases, the processor 112 can also generate commands to control the operation of the embedded device 120 (e.g., commands instructing the embedded device 120 to transmit data to the network 150). In some cases, the processor 112 can include a general purpose microprocessor (e.g., a central processing unit, or CPU), a special purpose processor (e.g., a graphics processing unit, or GPU), multiple processors, a multi-core processor, or a combination of these.

The processor 112 interacts with the embedded device 120 through a driver 114. The driver 114 is a component that controls or directs the operation of the embedded device 120. For example, in some cases, the driver 114 provides a layer through which commands issued by one or more processes of the processor 112 (e.g., commands issued by one or more user or system applications 118) are translated into commands that can be readily understood b the embedded device 120. These commands can then be transmitted to the embedded device 120 in order to access the functionality of the embedded device 120. In some cases, the driver 114 can be implemented in software, firmware, or combinations thereof. As an example, in some implementations, the driver 114 can be a software component that is executed by the processor 112 in order to mediate the interaction between the host 110 and the embedded device 120.

The interface module 116 communicatively couples the host 110 to the embedded device 120, and allows the host 110 and the embedded device 120 to exchange information (e.g., commands, messages, or any other data) with one another. As an example, in some cases, the interface module 116 allows information to be transmitted from the processor 112 and driver 114 to the embedded device 120. As another example, in some cases, the interface module 116 allows information to be transmitted from the embedded device 120 to the processor 112 and the driver 114.

In the example shown in FIG. 1, the embedded device 120 is an input/output device that enables the host 110 to receive data from and transmit data to the network 150. In some cases, the embedded device can operate in accordance with one or more standards. For example, in some cases, the embedded device 120 can operate in accordance with a Secure Digital Input/Output (SDIO) specification (e.g., the embedded device 120 can be a "SDIO" device).

In this example, the embedded device 120 includes a network module 122, a controller 124, an interface module 126, a memory 128, and a power module 136. These components of the embedded device 120 are communicatively coupled to each other through a device bus 130.

The network module 122 communicates with the network 150, for example by transmitting or receiving data over one or more channels of the network 150. The network module 122 can interact with wired networks (e.g., Ethernet networks) and/or wireless networks (e.g., Wi-Fi or Bluetooth networks), depending on the implementation. In some cases, the network module 122 can include one or more antennas 132 in order to wirelessly transmit information to and/or receive information from a wireless network.

The controller 124 generally controls the operation of the embedded device 120. In some cases, the controller 124 can relay data received from the network 150 to the host 110 or data received from the host 110 to the network 150 via the interface module 126. The controller 124 can be a general purpose microprocessor (e.g., a CPU) or a special purpose processor (e.g., an application-specific integrated circuit, or ASIC).

The controller 124 includes firmware (FW) 134 by which operation of the embedded device 120 is controlled. For example, in some cases, the firmware 134 can temporarily save, to the memory 128, data received by the embedded device 120 from the network 150 prior to transmitting the received data to the host 110. As another example, in some cases, the firmware 134 can temporarily save, to the memory 128, data downloaded from the host 110 prior to transmitting the downloaded data to the network 150. In some cases, the firmware 134 can pre-process the data saved in the memory 128 (e.g., segment the data into data packets) or process the temporarily saved data (e.g., parse content of the data for a particular characteristic), or both (e.g., segment the data into packets and retain only those packets that have the particular characteristic).

In some cases, the firmware 134 can also regulate the rate at which the embedded device 120 consumes power. For example, in some cases, the firmware 134 can change the power state of the embedded device 120 (e.g., by selectively enabling or disabling particular functions of the embedded device 120 in order to modify the power consumption characteristics of the embedded device 120).

The power module 136 provides electric power to the embedded device 120. In some cases, the power module acts as a self-contained power source (e.g., a battery that stores and releases electric energy). In some cases, the power module acts as an interface to an external power source (e.g., a power source included on the host 110 or elsewhere), and draws electric current as needed by the embedded device 120.

The memory 128 allows for the storage and retrieval of information. As an example, the memory 128 can store information received by the embedded device 120 from the host 110. As another example, the memory 128 can store information received by the embedded device 120 from the network 150. The memory 128 can include a volatile (non-persistent) storage medium, a non-volatile (persistent) storage medium, or a combination of both.

The interface module 126 manages the exchange of data (e.g., data packets) between the host 110 and the embedded device 120. In some implementations, the interface module 126 can operate according to a particular standard, such as the secure digital input/output (SDIO) standard.

In the example shown in FIG. 1, the interface module 126 is communicatively coupled to the interface module 116 of the host 110 in order to facilitate communication between the host 110 and the embedded device 120. As an example, as shown in FIG. 1, the interface module 116 and the interface module 126 can be communicatively coupled through a line "A" through which the host 110 exchanges messages (e.g., interrupts) with the interface module 126; messages received by the interface module 126 are then transmitted to the controller 124 and firmware 134 for interpretation. As another example, the interface module 116 and the interface module 126 can be communicatively coupled through a line "B" through which the host 110 transmits data to be transmitted to the network 150 and/or receives data that was received from the network 150. As another example, the interface module 116 and the interface module 126 can be communicatively coupled through a line "C" through which the interface module 116 transmits a clock signal (e.g., a periodic signal that oscillates between a high and a low state) to the embedded device 120 in order to synchronize the host 110 with the embedded device 120.

Although the example shown in FIG. 1 includes several components, this is merely an illustrative example. In practice, the system 100a can include fewer components, or one or more additional components instead of or in addition to those shown, depending on the implementation.

In some implementations, the embedded device 120 can operate according to multiple different power states in order to vary the amount of power that it consumes during operation. As an example, an embedded device can operate according to a relatively high power state (e.g., "wake" state); in this power state, the device draws a relatively large amount of power and permits the host 110 to access a relatively broad range of functionality of the embedded device. However, to conserve power, the embedded device can later transition into a lower power state (e.g., a "sleep" state); in this power state, the device draws less power, but as a trade-off, provides the host 110 with a comparatively limited range of functionality. This can be useful, for example, as it allows the embedded device 120 to draw less power when certain functionality of the embedded device 120 is not needed (e.g., when the embedded device 120 has been idle for some period of time, when the host 110 requires or otherwise requests access to only a limited range of functionality of the device 120, when the host 110 is not active, and so forth). The embedded device 120 can later transition back to the higher power state in order to re-enable its broad range of functionality at the expense of increased power consumption. Thus, the embedded device 120 can dynamically adjust its functionality and its power consumption based on the requirements of the host 110. Although two is power states are described, this is merely an illustrative example. In some cases, an embedded device can transition between more than two different power states (e.g., three, four, five, six, seven, or more), each defining a particular intermediate degree of device functionality and power consumption.

In general, the amount of power that is consumed by a device depends, at least in part, on the frequency of the clock domain of the device (e.g., the frequency of a clock signal used to synchronize the actions of the device's circuits). For example, a relatively high frequency clock domain often requires a relatively large core voltage applied to the processing circuits of the device in order to achieve the timing closure requirements necessary for a device function according to that higher frequency. As a result, the device requires a relatively large amount of power in order to operate at this higher frequency clock domain. On the other hand, a relatively lower frequency clock domain can handle a lower core voltage applied to the processing circuits of the device and still achieve the timing closure requirements necessary for a device function according to that lower frequency. As a result, the device requires a comparatively smaller amount of power in order to operate at this lower frequency clock domain. Thus, reducing the frequency of the clock domain of the embedded device while it is in a relatively lower power state can be beneficial, as it allows the device to operate according to reduced timing closure requirements, and correspondingly, require a smaller amount of power in order to function.

In general, the host 110 and the embedded device 120 can operate, at least in part, according to individual clock domains. For example, the host 110 can operate according to one clock domain (e.g., in accordance with a first clock signal generated by the processor 112), and the embedded device 120 can operate according to another clock domain (e.g., in accordance with a second clock signal generated by the controller 124). To synchronize these two clock domains, the host 110 can transmit a clock signal (e.g., using the line "C" between the interface modules 116 and 126).

However, in some cases, when the embedded device 120 is in a relatively tow power state, the embedded device 120 can disable or otherwise reduce the functionality one or more of its components, such that it no longer generates an internal clock signal. To maintain communication between the embedded device 120 and the host 110, the interface module 126 can remain enabled, such that certain commands transmitted by the host 110 (e.g., a command to transition from the lower power state to the higher power state) are recognized and properly interpreted. In response to detecting the command (or commands), the embedded device 120 can activate one or more appropriate portions of the embedded device 120 to enable further communications between the host 110 and the embedded device 120.

In order to facilitate this functionality, the host 110 can continuously transmit a clock signal to the embedded device 120, such that the interface module 126 operates according to an external clock domain provided by the host 110. Thus, even if the embedded device disables or otherwise limits the functionality of one or more of the other components of the embedded device 120 (e.g., such that it no longer generates an internal clock signal), the interface module 126 remains capable of receiving data (e.g., commands) transmitted by the host 110 and activating the appropriate portions of the embedded device 120 in response.

Further, to manage the rate of power consumption by the embedded device 120, the host 110 can dynamically adjust the frequency of the clock signal that is transmitted between the host 110 and the embedded device 120. For example, while the embedded device is in a relatively lower power state (e.g., a "sleep" or a "power save" state), the host 110 can transmit a clock signal having a relatively low frequency to the embedded device 120. However, while the embedded device is in a relatively higher power state (e.g., a "wake" state or an "active" state), the host 110 can transmit a clock signal having a relatively higher frequency to the embedded device 120. Communications sent between the host 110 and the embedded device 120 are transmitted according to this dynamic clock signal, such that they can be properly interpreted by the embedded device 120. This dynamic adjustment reduces the power requirements of the embedded device 120 while it is in its lower power state, while preserving the embedded device's ability to interpret commands (e.g., commands to transition to a higher power state) transmitted from the host driver while it is in the lower power state.

Figure 2:
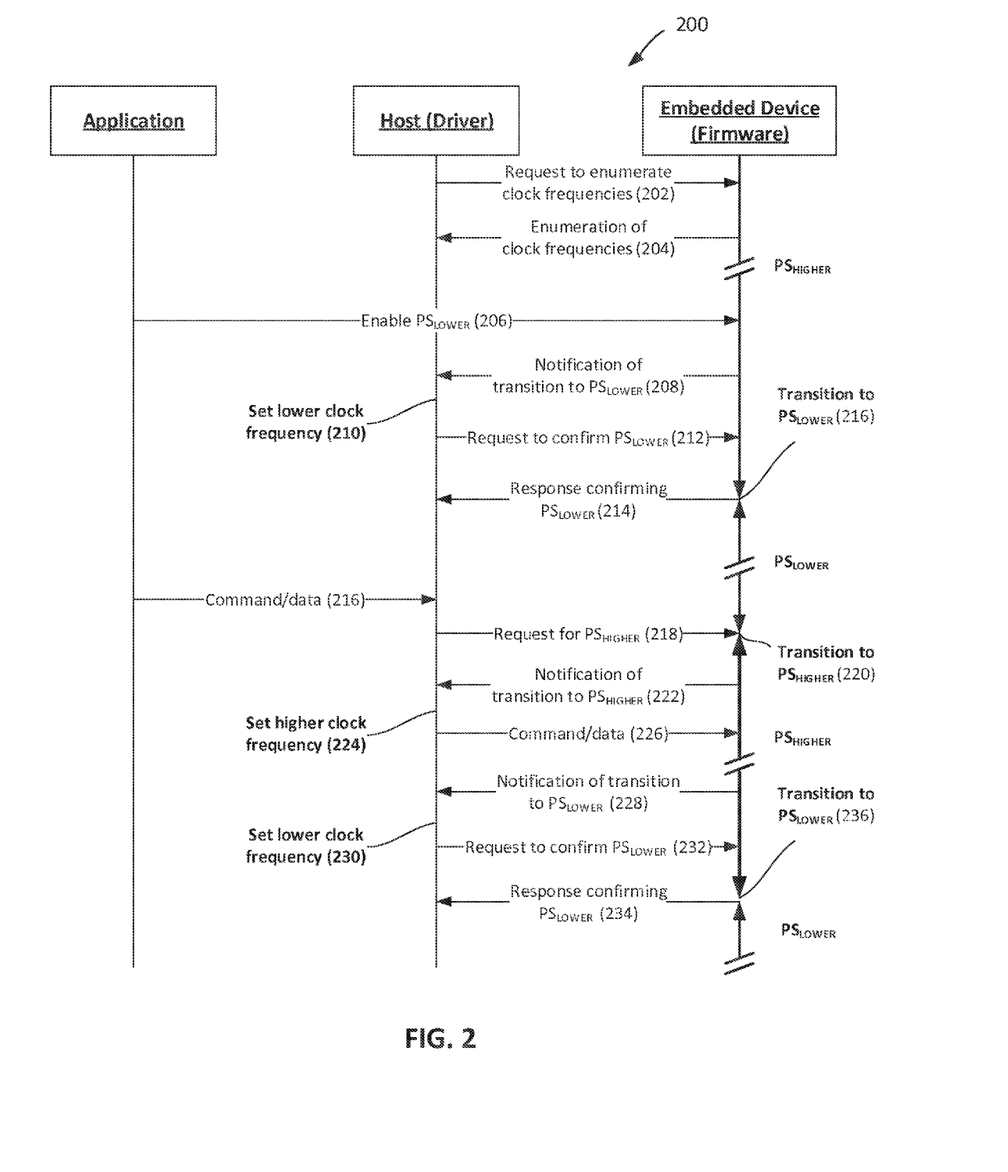
FIG. 2 is a flow diagram of an example of a process for dynamically adjusting the frequency of a clock signal transmitted between a host device and an embedded device.

An example of a process 200 for dynamically adjusting the frequency of a clock signal transmitted between a host device and an embedded device is shown in FIG. 2. In this example, an interaction between an application on a host device, a driver on a host device, and a firmware on an embedded device is shown. In some cases, the process 200 can be implemented by system 100a shown in FIG. 1.

The embedded device begins in a relatively higher power state (labeled FIG. 2 as $PS_{HIGHER}$). In this higher power state, the embedded device permits the host to access a relatively broad range of functionality of the embedded device. In some cases, this power state can be referred to as an "active" state, a "wake" state, or a "functional" state.

In this example, the embedded device can also transition into a relatively lower power state (labeled in FIG. 2 as $PS_{LOWER}$). In this relatively lower power state, the embedded draws less power, but as a trade-off provides the host with a comparatively limited range of functionality. In some cases, this power state can be referred to as an "inactive" state, a "sleep" state, or a "power save" state.

While the embedded device is in the higher power state, the host device transmits a dock signal having a relatively higher frequency to the embedded device. This clock signal has a frequency sufficiently high such that the embedded device can provide its broad range of functionality. In some cases, the clock signal can have a frequency of 100 MHz or greater (e.g., 100 MHz, 120 MHz, 140 MHz, 160 MHz, 180 MHz, 200 MHz, or greater).

During this time, the host transmits a request to the embedded device to enumerate the clock frequency parameters of the embedded device at 202. The clock frequency parameters include, for instance, the one or more clock frequencies by which the embedded device can operate while in each of its power states. This request is sent in accordance with the relatively high clock frequency.

In response, the embedded device enumerates its clock frequency parameters to the host at 204. As an example, the embedded device can operate according to a first clock frequency when it is in a higher power state, and according to a second clock frequency when it is in a lower power state. The embedded device can thus enumerate each of these clock frequencies and their associated power states to the host. The enumerated frequencies and associated power states can be retained by the host for future reference e.g., stored in memory associated with the host).

At some point later, the embedded device can receive a command to transition to its lower power state. As shown in FIG. 2, in some cases, this occurs if an application transmits a command to the embedded device enabling the lower power state at 206. In some cases, this command can be transmitted in accordance with a particular standard. As an example, the command can be transmitted in accordance with an SDIO specification instructing the embedded device to enter a "power saving" mode (e.g., "PS mode").

In response to receiving this command, the embedded device transmits, to the host, a notification that it is transitioning to the lower power state at 208. In some cases, this notification can be transmitted in accordance with a particular standard. As an example, the notification can be transmitted in accordance with an SDIO specification reporting that a "sleep" event is about to occur (e.g., a "PS_SLEEP" event). In some cases, a notification can be in the form of a message or data structure that includes one or more data flags (e.g., one or more bits or bytes) or other data structures that indicate that a particular event has occurred or is about to occur.

In response to receiving the notification, the host device reduces the frequency of the clock signal that is transmitted from the host device to the embedded device at 210. This reduced frequency can be selected, for example, based on the enumerated clock frequencies provided by the embedded device. As an example, upon receiving the notification that the embedded device is transitioning to the lower power state, the host device can determine the enumerated clock frequency associated with that lower power state and adjust the frequency of the clock signal accordingly. In some cases, the reduced clock signal can have a frequency of 10 MHz or less (e.g., 10 MHz, 8 MHz, 6 MHz, 4 MHz, 2 MHz, or less).

After reducing the frequency of the clock signal, the host device transmits a request to the embedded device to confirm that the embedded device is transitioning to is the lower power state at 212. This request is sent in accordance with the reduced clock frequency.

In response, the embedded device transmits a response confirming that it is transitioning into the lower power state at 214, and enters the lower power state at 216.

While the embedded device is operating in its lower power state, the host continues to transmit a clock signal having the reduced frequency to the embedded device. Due to this reduction in clock frequency; the embedded device has lower power requirements (e.g., lower timing closure requirements, resulting in a corresponding reduction in core voltage requirements). As a result, the embedded device can reduce its power consumption (e.g., by reducing its core voltage, reducing the frequency of its internally generated clock signal, and so forth) while maintaining its ability to interpret commands that are sent in accordance with the reduced clock frequency.

While the embedded device in operating in its lower power state, the embedded device can receive a command to transition back to its higher power state. As shown in FIG. 2, this can occur if the application transmits, to a driver of the host device, a command or other data to be transmitted to the embedded device for execution or processing at 216. In response, the host device transmits, to the embedded device, a command requesting the higher power state of the embedded device at 218, such that the command can be executed or the data processed. In some cases, this command can be transmitted in accordance with a particular standard. As an example, the command can be transmitted in accordance with a SDIO specification instructing that data be written or retrieved from the device (e.g., a "CMD52" or "CMD53" command). This command is sent in accordance with the reduced dock frequency.

In response, the embedded device transitions to the requested higher power state at 220. In anticipation of an increase in the clock signal, the embedded device can increase its power consumption (e.g., by increasing its core voltage) in order to accommodate the increased timing closure requirements resulting from the anticipated increase in the clock signal.

The embedded device also transmits, to the host, a notification that it is transitioning to the higher power state at 222. In some cases, this notification can be is transmitted in accordance with a particular standard. As an example, the notification can be transmitted in accordance with a SDIO specification reporting that an "awake" event has occurred (e.g., a "PS_AWAKE" event). In some cases, a notification can be in the form of a message or data structure that includes one or more data flags (e.g., one or more bits or bytes) or other data structures that indicate that a particular event has occurred or is about to occur.

In response to receiving the notification, the host device increases the frequency of the clock signal that is transmitted from the host device to the embedded device at 224. This increased frequency can be selected, for example, based on the enumerated clock frequencies provided by the embedded device. As an example, in some cases, upon receiving the notification that the embedded device is transitioning to the higher power state, the host device can determine the enumerated clock frequency associated with that higher power state and adjust the frequency of the clock signal accordingly. In some cases, the increased clock signal can have a frequency of 100 MHz or greater.

After increasing the frequency of the clock signal, the host device transmits the command or other data received from the application for execution or processing by the embedded device at 226.

Some point after completing the execution of received command or completing the processing of the received data, the embedded device can transition back to the lower power state. For example, this can occur if the embedded device has been idle for a period of time (e.g., having not received any commands or data from the host device for a period of time), or if it receives an express command from the host device to transition back to the lower power state.

Prior to transitioning back to the tower power state, the embedded device transmits, to the host, a notification that it is transitioning back to the lower power state at 228. As above, in some cases, this notification can be transmitted in accordance with a particular standard. As an example, the notification can be transmitted in accordance with a SDIO specification reporting that a "sleep" event is about to occur (e.g., a "PS_SLEEP" event). In some cases, a notification can be in the form of a message or data structure that includes one or more data flags (e.g., one or more bits or bytes) or other data structures that indicate that a particular event has occurred or is about to occur.

In response to receiving the notification, the host device reduces the frequency of the clock signal that is transmitted from the host device to the embedded device at 230. As above, this reduced frequency can be selected, for example, based on the enumerated clock frequencies provided by the embedded device. As an example, in some cases, upon receiving the notification that the embedded device is transitioning to the lower power state, the host device can determine the enumerated clock frequency associated with that lower power state and adjust the frequency of the clock accordingly. In some cases, the reduced clock signal can have a frequency of 10 MHz or less.

After reducing the frequency of the clock signal, the host device transmits a request to the embedded device to confirm that the embedded device is transitioning to the lower power state at 232. This request is sent in accordance with the reduced clock frequency.

In response, the embedded device transmits a response confirming that it is transitioning into the lower power state at 234, and enters the lower power state at 236.

Thus, while the embedded device is operating in its lower power state, the host transmits a clock signal having the reduced frequency to the embedded device. As a result, the embedded device has lower power requirements, but can continue to receive at least some commands from the host device according to the reduced clock frequency (e.g., commands to transition to a higher power state). Further, the frequency of the clock signal can be selectively increased when the embedded device is operating in its higher power state (e.g., in response to a command to execute a command or process data). As a result, the power consumption of the device can be dynamically managed in order to improve its power consumption characteristics.

Although the above example described how an embedded device can transition between two different power states (e.g., a "higher" power state and a "tower" power state), this is merely an illustrative example. In practice, an embedded device can is transition between any number of different power states (e.g., three, four, five, six, seven, or more), each having a corresponding range of functionality. Likewise, the host device can dynamically adjust the clock signal that is transmitted between the host device and the embedded device between any number of different frequencies (e.g., three, four, five, six, seven, or more) in order to manage the power consumption characteristics of the embedded device. Further, the embedded device can dynamically adjust its rate of power consumption between any number of different rates (e.g., by adjusting its core voltage between any number of different voltages, such three, four, five, six, seven, or more voltages) in order to provide more efficient power consumption characteristics during operation.

As an example, in some cases, the embedded device can transition between three power states. In its highest power state (e.g., a fully "functional" power state), the embedded device has its full range of functionality. In this state, the host device transmits a clock signal having the highest frequency to the embedded device, such that it can perform tasks according to its full functionality. In its moderate power state (e.g., a "power save" power state), the embedded device has somewhat reduced functionality. In this state, the host device transmits a clock signal having a relatively tower frequency to the embedded device, such that its rate of power consumption is reduced while performing tasks to its somewhat reduced functionality. In its lowest power state (e.g., a "deep sleep" power state), the embedded device has highly reduced functionality. However, in this state, the host device continues to transmit a clock signal having a low frequency to the embedded device, such that it can interpret a limited number of commands (e.g., commands to transition to other power states). In this manner, the clock signal can be dynamically adjusted between three frequencies depending on the power state of the embedded device.

Although example power states are described, these are merely illustrate examples. In practice, other power states and combinations of power states are also possible, depending on the implementation.

For instance, in some cases, the power state of an embedded device can correspond to the percentage of time in which an embedded device operates in an "awake" operational state (e.g., an operational state in which it is listening for commands from a host device) versus a "steep" operational state (e.g., an operational state in which it not listening for commands from the host device). As an example, in some implementations, an embedded device in a lower power state can periodically transition between an "awake" state and a "sleep" state according to a particular duty cycle, such that it operates according to the "awake" state for some percentage of time. In contrast, when the embedded device in a higher power state, it can periodically transition between an "awake" state and a "sleep" state according to a different duty cycle, such that it operates according to the "awake" state for some larger percentage of time (or in some cases, such that it operates entirety according to the "awake" state). Other types of power states are also possible, depending on the implementation.

In some cases, an embedded device can support communication with one or more networks according to a particular communications standard. For example, in some cases, an embedded device can communicate with a network according to a Bluetooth standard (e.g., Bluetooth 1.0, Bluetooth 2.0, Bluetooth 3.0, Bluetooth 4.0, among others) or according to a Wi-Fi standard (e.g., IEEE 802.11a, 802.11b, 802.11g, 802.11n, 801.11ac, among others). In some implementations, the embedded device can support communication according to several different standards (e.g., in order to provide "multi-function operations") in order to facilitate simultaneous or sequential communication according to each of the different standards. As each standard can have different operating requirements (e.g., different data processing requirements, data throughput requirements, dynamic power range requirements, and so forth), the embedded device can have different clock speed requirements depending on the communication standard that is being used.

For example, a communication standard such as Wi-Fi is often associated with comparative high data throughput speed, high data processing requirements, and high dynamic power range requirements. Correspondingly; an embedded device communicating according to this standard, in some cases, operates according to a relatively high clock speed (e.g., 100 MHz or more). However, a communication standard such as Bluetooth is often associated with a relatively lower data throughput speed, relatively lower data processing requirements, and relatively lower dynamic power range requirements. Correspondingly, an embedded device can communicate according to this standard using a relatively lower clock speed (e.g., 10 MHz or less). In a similar manner as described above, the frequency of the clock signal that is transmitted between a host device and an embedded device can be dynamically adjusted based on the type of communication that is being conducted.

Figure 3:
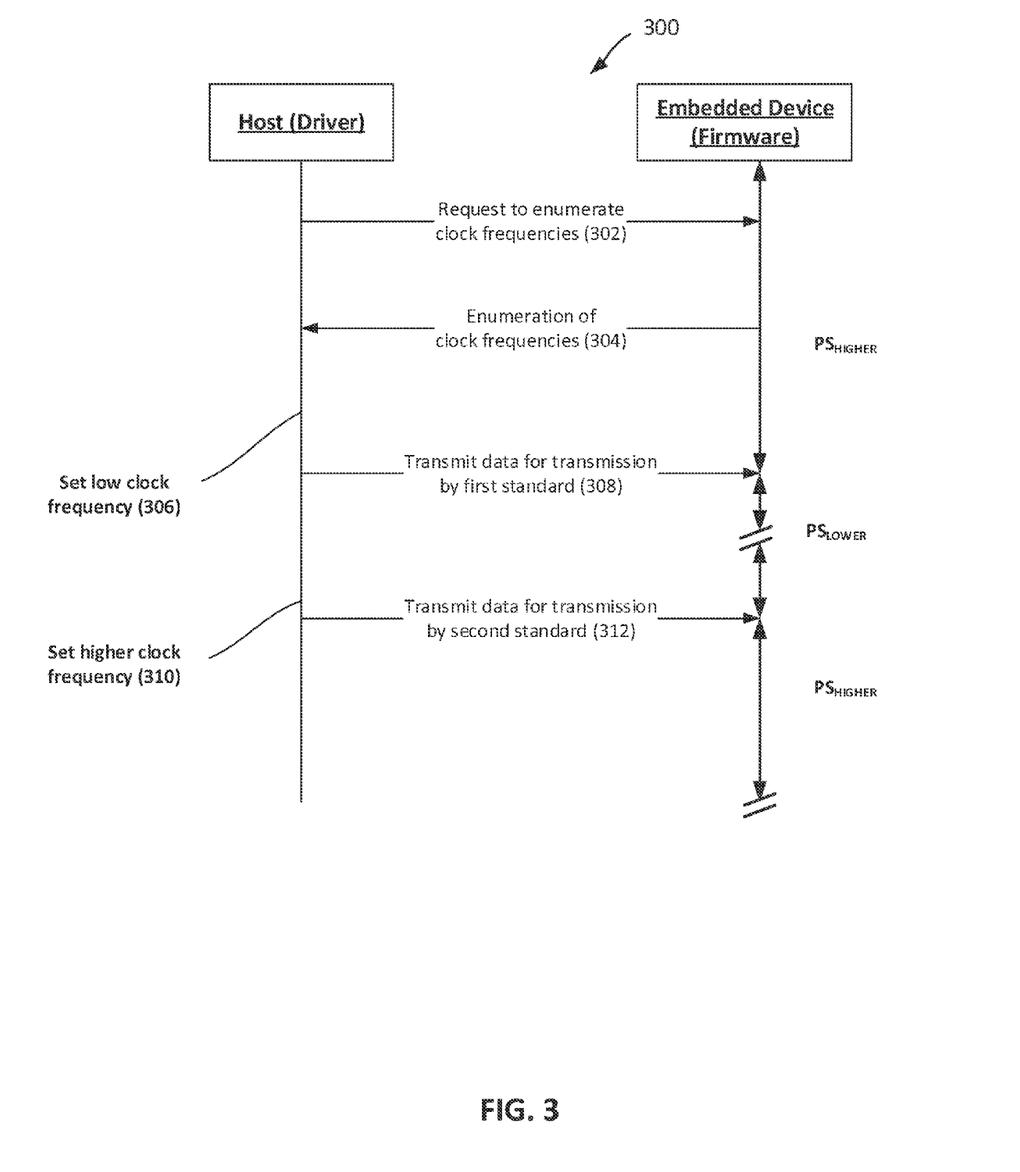
FIG. 3 is a flow diagram of an example of a process for dynamically adjusting the frequency of a clock signal transmitted between a host device and an embedded device based on the type of communication that is being conducted.

An example of a process 300 for dynamically adjusting the frequency of a clock signal transmitted between a host device and an embedded device based on the type of communication that is being conducted is shown in FIG. 3. In this example, an interaction between an application on a host device and an embedded device is shown. In some cases, the process 300 can be implemented by system 100a shown in FIG. 1.

In the example shown, the embedded device can communicate according to two different communications standards, each having different clock signal frequency requirements, and correspondingly, each having different power consumption requirements. As an example, one communications standard could be a Bluetooth communication standard, and the other could be a Wi-Fi communication standard.

The embedded device begins in a relatively higher power state (labeled in FIG. 3 as $PS_{HIGHER}$). In this higher power state, the embedded device permits the host to transmit data according to both communication standards. While the embedded device is in the higher power state, the host device transmits a clock signal having a relatively higher frequency to the embedded device. This clock signal has a frequency sufficiently high such that the embedded device can communicate according to either communication standard. In some cases, the clock signal can have a frequency of 100 MHz or greater.

During this time, the host transmits a request to the embedded device to enumerate the clock frequency parameters of the embedded device at 302. The clock frequency parameters include, for instance, the one or more clock frequencies by which the embedded device can operate while communicating according to each of its supported communications standards. This request is sent in accordance with the relatively high clock frequency.

In response, the embedded device enumerates its clock frequency parameters to the host at 304. As an example, the embedded device can operate according to a first clock frequency when it is transmitting data only according to the communication standard having the lower power requirements (e.g., Bluetooth), and according to a higher clock frequency when it is transmitting data only according to the communication standard having the higher power requirements (e.g., Wi-Fi) or according to both communications standards. The enumerated frequencies and associated communications standards can be retained by the host for future reference (e.g., stored in memory associated with the host).

When the host device wishes to transmit data according to the communication standard having the lower power requirements (e.g., Bluetooth), the host device reduces the frequency of the clock signal that is transmitted from the host device to the embedded device at 306. This reduced frequency can be selected, for example, based on the enumerated clock frequencies provided by the embedded device. As an example, in some cases, the host device can determine the enumerated clock frequency associated with the selected communication standard and adjust the frequency of the clock signal accordingly. In some cases, when the selected communication standard is Bluetooth, the reduced clock signal can have a frequency of 10 MHz or less.

After reducing the frequency of the clock signal that is transmitted from the host device to the embedded device, the host device transmits the data to the embedded device for processing (e.g., for transmission across a network according to the selected communication standard) at 308. As the data is transmitted according to the reduced clock frequency, the embedded device can also operate according to the reduced clock frequency, thereby reducing its power requirements. As an example, the embedded device can reduce its core voltage, reduce the frequency of its internally generated clock signal, and so forth.

When the host device wishes to transmit data according to the communication standard having the higher power requirements (e.g., Wi-Fi), the host device increases the frequency of the clock signal that is transmitted from the host device to the embedded device at 310. As above, this increased frequency can be selected, for example, based on the enumerated clock frequencies provided by the embedded device. As an example, in some cases, the host device can determine the enumerated clock frequency associated with the selected communication standard and adjust the frequency of the clock signal accordingly. In some cases, when the selected communication standard is Wi-Fi, the increased clock signal can have a frequency of 100 MHz or greater. As the data is transmitted according to the increased clock frequency, the embedded device can increase its power consumption in order to operate according to the increased clock frequency. As an example, the embedded device can increase its core voltage, increase the frequency of its internally generated clock signal, and so forth.

After increasing the frequency of the clock signal that is transmitted from the host device to the embedded device, the host device transmits the data to the embedded device for processing (e.g., for transmission across a network according to the selected communication standard) at 312.

Thus, in order to enable data transmission according to a communication standard having lower processing requirements, the host transmits a clock signal having the reduced frequency to the embedded device. As a result, the embedded device has lower power requirements during operation, and can dynamically reduce its power draw in response. Further, the frequency of the clock signal can be selectively increased in order to enable data transmission according to a communication standard having greater processing requirements. As a result, the power consumption of the device can be dynamically managed in order to improve its power consumption characteristics based on the type of communications that are being conducted by the embedded device.

Although the above example described how an embedded can transmit data using two different communications standards (e.g., Bluetooth and Wi-Fi), this is merely an illustrative example. In practice, an embedded device can transition between any number of different communications standards (e.g., three, four, five, or more), each having corresponding data processing and power consumption requirements. Likewise, the host device can dynamically adjust the clock signal that is transmitted between the host device and the embedded device between any number of different frequencies (e.g., three, four, five, or more) in order to manage the power consumption characteristics of the embedded device.

As an example, in some cases, an embedded device can transmit data using three different communications standards, each having different data processing and power consumption requirements. The host device can dynamically adjust the clock signal that is transmitted between the host device and the embedded device in order to manage the power consumption characteristics of the embedded device according to the communications standard that is being used. For example, when the embedded device is communicating according to a first communications standard having relatively high data processing and power consumption requirements, the host device can transmit a relatively high frequency clock signal to the embedded device. However, when the embedded device is communicating according to a second communications standard having moderate data processing and power consumption requirements, the host device can transmit a clock signal having a moderately reduced frequency to the embedded device. Further, when the embedded device is communicating according to a third communications standard having relatively low data processing and power consumption requirements, the host device can transmit an even lower frequency clock signal to the embedded device. Thus, the embedded device can dynamically adjust its power consumption characteristics depending on the communications standard being used.

Further, although examples of processes for dynamically adjusting a clock signal based on either the power state of the embedded device or the communications standard being used are described above, in some cases, a clock signal can be dynamically adjusted based on both criteria. For example, in some cases, a host device can dynamically adjust the clock signal based on whether the embedded device is in a "power save" or fully "functional" state, while also adjusting the clock signal based on the communications standard being used in each of the different power states, in practice, other combinations of criteria are also possible, depending on the implementation.

As discussed above, dynamically adjusting the frequency of the clock signal can result in more efficient power consumption by the embedded device. As an illustrative example, if an embedded device supports communications using both Bluetooth and Wi-Fi communications standards, the clock signal that is transmitted between the host device and the embedded device can be approximately 10 MHz when the embedded device is operating according to the Bluetooth standard, and approximately 100 MHz when the embedded device is operating according to the Wi-Fi standard. In this example, to support operation using a clock frequency of 10 MHz, the embedded device requires a core voltage of 0.8V, resulting in a power draw of approximately 50 mW. However, to support operation using a clock frequency of 100 MHz, the embedded device requires a core voltage of 1.1V, resulting in a power draw of approximately 1 W. Thus, the power consumption of the embedded device can be managed, at least in part, by dynamically adjusting the frequency of the clock signal that is transmitted between the host device and the embedded device. Although examples of clock frequencies, core voltages, and power draws are described herein, these are merely examples to illustrate how the power consumption of an embedded device can be managed by dynamically adjusting the frequency of the clock signal. In practice, other clock frequencies, core voltages, and power draws are possible, depending on the implementation.

Further, although example embedded devices having network-related input-output functionality are described above, these are also merely illustrative examples. In practice, an embedded device can have other functions, either in addition to or instead of those described. As for example, in some cases, an embedded device can be a GPS receiver, a modem, a barcode reader, a FM radio/TV tuner, a RFID reader, a digital camera, or other device. In a similar manner as above, the power consumption of the embedded device can be managed, at least in part, by dynamically adjusting the frequency of the clock signal that is transmitted between the host device and the embedded device according to the power state, the data processing characteristics, and/or power consumption characteristics of the embedded device during operation.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, hut rather as descriptions of features that may be specific to particular embodiments. Certain features that are described in this specification in the context of separate embodiments can also be implemented in combination in a single embodiment. Conversely; various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in ail embodiments.

Other embodiments fall within the scope of the following claims.

What is claimed is:

1. A method comprising:
   determining, at a host device, a power state of a digital input/output device embedded in the host device;
   transmitting a clock signal having a first frequency from the host device to the input/output device responsive to a determination that the input/output device is in a lower power state;
   determining, at the host device, that the input/output device has transitioned into a higher power state based on a message received from the input/output device, the message comprising a confirmation of a command to retrieve data from the input/output device or write data to the input/output device; and
   transmitting a clock signal having a second frequency from the host device to the input/output device responsive to a determination that the input/output device has transitioned into the higher power state,
   wherein the first frequency is lower than the second frequency.

2. The method of claim 1, wherein the command comprises a CMD52 command or a CMD53 command in accordance with a secure digital input/output (SDIO) standard.

3. The method of claim 1, wherein the message comprises an indication that the input/output device has successfully transitioned into the higher power state.

4. The method of claim 1, wherein the lower power state corresponds to a sleep state of the input/output device, and wherein the higher power state corresponds to an active state of the SDIO device.

5. The method of claim 1, wherein the lower power state corresponds to a data transmission conducted by the input/output device according to a first communication standard, and wherein the higher power state corresponds to a data transmission conducted by the input/output device according to a second communication standard.

6. The method of claim 5, wherein the first communication standard is Bluetooth and the second communication standard is Wi-Fi, and
   wherein the host device operates according to a first dynamic power range while transmitting data according to the first communication standard, and the host device operates according to a second dynamic power range while transmitting data according to the second communication standard, wherein the first dynamic power range is greater than the second dynamic power range.

7. The method of claim 1, further comprising:
   determining, at the host device, that the input/output device is transitioning into the lower power state; and
   transmitting a clock signal having the first frequency from the host device to the input/output device responsive to a determination that the input/output device is transitioning into the lower power state.

8. The method of claim 7, wherein determining that the input/output device is transitioning into the lower power state comprises:
   transmitting, from the host device to the input/output device, a second command to enter the lower power state;
   receiving, at the host device from the input/output device, a second message responsive to the second command; and
   determining, at the host device, that the input/output device is transitioning into the lower power state based on the second message.

9. The method of claim 1, further comprising:
   transmitting, from the host device to the input/output device, a request to enumerate the first frequency and the second frequency; and
   receiving, at the host device from the input/output device, an indication of the first frequency and an indication of the second frequency.

10. The method of claim 1, wherein the input/output device is a secure digital input/output (SDIO) device.

11. A digital input/output device comprising:
    an interface module configured to communicatively couple with a host device;
    a power module configured to couple with a power supply;
    a network module; and
    a controller coupled with the interface module and the power module, the controller being configured to:
    transmit, to the host device via the interface module, a first message indicating that the input/output device is in a lower power state;
    responsive to transmitting the first message, receive, from the host device via the interface module, a first clock signal having a first frequency;
    transmit, to the host device via the interface module, a second message indicating that the input/output device has transitioned into a higher power state;
    responsive to transmitting the second message, receive, from the host device via the interface module, a second clock signal having a second frequency;
    cause the power module to draw power from the power supply according to a first power range while the interface module is receiving the first clock signal;
    cause the power module to draw power from the power supply according to a second power range while the interface module is receiving the second clock signal;
    direct the network module to transmit data according to a first communication standard while the input/output device is in the higher power state; and
    direct the network module transmit data according to a second communication standard while the input/output device is in the lower power state,
    wherein the first frequency is lower than the second frequency, and wherein the first power range is less than the second power range, and wherein the digital input/output device is configured to be embedded in the host device.

12. The digital input/output device of claim 11, wherein the second message comprises a confirmation of a command to retrieve data from the input/output device or write data to the input/output device.

13. The digital input/output device of claim 12, wherein the command comprises a CMD52 command or a CMD53 command in accordance with a secure digital input/output (SDIO) standard.

14. The digital input/output device of claim 11, wherein the second message comprises an indication that the input/output device has successfully transitioned into the higher power state.

15. The digital input/output device of claim 11, wherein the first communication standard is Wi-Fi and the second communication standard is Bluetooth.

16. The digital input/output device of claim 11, wherein the controller is further configured to:
   transmit, to the host device via the interface module, a third message that the input/output device is transitioning into the lower power state; and
   responsive to transmitting the third message, receive, from the host device via the interface module, the first clock signal having the first frequency.

17. The digital input/output device of claim 11, wherein the power module is configured to:
   apply a first core voltage to a processing circuit of the controller while the interface module is receiving the first clock signal; and
   apply a second core voltage to the processing circuit of the controller while the interface module is receiving the second clock signal,
   wherein the first core voltage is less than the second core voltage.

18. The digital input/output device of claim 11, wherein the controller is configured to generate an internal clock signal while the input/output device is in the higher power state, and not generate the internal clock signal while the input/output device is in the lower power state.

19. The digital input/output device of claim 11, wherein the digital input/output device is a secure digital input/output (SDIO) device.

20. A system comprising:
a host device; and
a digital input/output device embedded in the host device;
wherein the input/output device is configured to:
   transmit, to the host device, a first message indicating that the input/output device is in a lower power state;
   transmit data according to a first communication standard while the input/output device is in the lower power state;
   transmit, to the host device, a second message indicating that the input/output device has transitioned into a higher power state; and
   transmit data according to a second communication standard while the input/output device is in the higher power state;
wherein the host device is configured to:
   receive, from the input/output device, the first message;
   responsive to receiving the first message, transmit, to the input/output device, a first clock signal having a first frequency;
   receive, from the input/output device, the second message; and
   responsive to receiving the second message, transmit, to the input/output device, a second clock signal having a second frequency; and
wherein the first frequency is less than the second frequency.

21. The system of claim 20, wherein the second message comprises a confirmation of a command to retrieve data from the input/output device or write data to the input/output device.

22. The system of claim 20, wherein the input/output device is further configured to transmit, to the host device, a third message that the input/output device is transitioning into the lower power state, and
   wherein the host device is configured to transmit, to the input/output device, the first clock signal having the first frequency in response to receiving the third message from the input/output device.

23. The system of claim 22, wherein the input/output device is configured to transmit the third message in response to receiving a command from the host device to enter the lower power state.

* * * * *